Patented May 1, 1934

1,957,336

UNITED STATES PATENT OFFICE 1,957,336

BLEACHING AGENT FOR FLOUR AND PROCESS OF UTILIZING SAME IN MAKING BREAD

Louis W. Haas, Chicago, Ill., and Ralph M. Bohn, Evanston, Ill., assignors, by mesne assignments, to J. R. Short Milling Company, Chicago, Ill., a corporation of Illinois.

No Drawing. Application February 8, 1933
Serial No. 655,858

16 Claims. (Cl. 99—10)

This invention relates to a process of bleaching vegetable flour by the use of material containing active enzymes found in certain raw vegetable matter.

The present invention includes a process in which extracts of the vegetable matter or dispersions thereof are employed as bleaching agents and are added to a dough mix in suitable proportions for effecting the whitening of flour employed in the dough while the dough is being worked.

In application Serial No. 310,673, filed October 5, 1928 by Haas and Bohn, and in application of L. W. Haas, Serial No. 498,837 filed November 28, 1930 and Serial No. 570,963 filed October 24, 1931 processes are described whereby bleaching of flour in a dough mix is accomplished by means of all-vegetable decolorizing agents in powdered form.

Application Serial No. 310,673 discloses the preparation of vegetable decolorizing means, from soy-beans for example, by a method as follows: The beans are soaked for twelve to forty-eight hours in water at approximately room temperature, using enough water to cover the beans at all times. At the end of the steep period, the water is drained off and the beans are well washed with two or three changes of fresh water. After draining off the water the beans are ground in a mill which reduces them to a paste or sludge. This paste or sludge with or without the addition of gelatinized corn flour or the like is dried at a low temperature not exceeding 60° C. in vacuo and then ground to a powder.

By another method disclosed in the last mentioned application, the soaked soy-beans may be ground with additional water; subjected to filtration through cloth to remove the fiber, and the filtrate, dried at a low temeprature and ground to a powder.

A method described in application Serial No. 498,837 is as follows:

Soy-beans are washed to free them from adhering dirt and dried immediately at a temperature of not over 155° F. or preferably not over 120° F. to 130° F., for a sufficient length of time to reduce their moisture content to 8% or less. The beans, thus treated, are ground to a flour, while removing the hulls. The hull-free material is further reduced to a fine powder. The finer the granulation, the better, so long as during the process the temperature of the material does not rise above 155° F.

As taught in the aforesaid applications, the powdered soy-bean material prepared as described, is mixed with flour to be used for baking or with a dough mix to effect under proper conditions the bleaching of the flour or more exactly the decolorization of the yelow carotin which gives unbleached flour its characteristic yellowish color.

As mentioned above, it has been further found that extracts or dispersions of certain vegetable materials, including soy beans, are also effective in processes of bleaching flour. In treating soy beans for example, beans may or may not be subjected to any treatment before preparation of the extract or dispersion, other than washing to remove dirt or other deleterious matter. Cleaned soya beans are preferably ground directly and the ground material thoroughly mixed with water. In this manner a soy-bean milk is prepared which is added to a dough mix in the proportions necessary to effect the desired bleaching action.

After ground soy-beans are mixed with water the resulting milky product is preferably freed from coarse material including fibers, either by filtration, centrifuging, or by decantation after settling.

Another method of preparing soy-bean milk is by soaking soy-beans in water for a period of twelve to forty-eight hours. The soaked beans are ground to reduce them to a paste which is stirred in water to produce the milk. By still another method, soy-beans may be cleaned and roasted at low temperatures but without destroying the active dough-bleaching ingredients in the bean material, and then ground and mixed with water to produce the milk.

Soy-bean milk is added to a dough mix in quantities to correspond to about two parts by weight of solids in the milk, as an upper limit, to one hundred parts by weight of flour. The concentration of the milk may be adjusted to permit of the proper addition of liquid to the dough or to avoid the inclusion of excessive amounts of liquid. The concentration of the solids in the milk depends to a certain extent upon the proportion of effective bleaching agent present and the amounts necessary to produce the whitening desired without affecting too adversely the flavor of the finished baked product. Above the proportions stated as the upper limit for soy-bean milk, the flavor of soy-beans is likely to be noticeable and the quality is thus lowered. When dry bleaching agent is used, it has been found that as low as .0625 per cent has proved effective. If vegetable "milk" proves to be somewhat more potent than dry material the weight of solids in the liquid could be correspondingly less.

*Example*

A dough may be prepared from the following ingredients:

700 pounds flour
63 pounds water
21 pounds sugar
12.25 pounds salt
14 pounds shortening
16 pounds yeast
Plus soy-bean milk corrspending to 1% solids with respect to flour, the liquid of the "milk" being substituted for the usual water in the dough mix, depending on conditions.

To obtain the best bleaching results, it has been found that very thorough mixing is an essential requirement. The presence of air or oxygen is necessary. The mixing can be satisfactorily conducted in high speed mixing machines having a rotary agitator, for instance, making a speed of 60 to 75 revolutions per minute, as described in applications, Serial Nos. 498,837 and 570,963. Slow or high speed mixing may be used, but with slow speed longer agitation is needed to complete the bleaching action. Good results are obtained by addition of "Ceratose" now known as "Ceratex", a gelatinized corn flour or other cereal flour to the mix along with soy-bean milk. Also the soy-bean milk may be subjected to an acid treatment by adding acetic acid for instance, and centrifuging. Another method of treatment is to coagulate the soya casein present in the milk, with small quantities of calcium salts and then separate the resulting liquor from the solid material by filtering or centrifuging or both. The liquor and washings thus obtained in the acid treatment or the salt treatment may be added to the dough mix to obtain the bleaching effect.

The invention is not limited to the use of extracts from or dispersions of soy-bean material alone, as other types of vegetable material have been found to yield extracts or dispersions containing active carotin-decolorizing enzymes, though to a somewhat less extent than soy-beans. For example, a "milk" may be prepared from navy beans or lentils.

As to other sources of bleaching material, it has been found that most other common legumes, i. e. beans, peas, lentils, etc., contain some bleaching material principle. However, they are all somewhat inferior in this respect to the soybean. Navy beans, kidney beans, lima beans, and other beans contain only about half as much active ingredient. Lentils and peas, including green peas and yellow split peas, seem to contain a little more than even beans, but their strength, too, is much lower than that of soy beans. In addition, these other beans and legumes are much higher in price than soy-beans, so that soy-beans seem to be the most practical source of bleaching principle. It has been found that horse radish and turnips possess bleaching properties, but they, too, are inferior to the soybean as to potency and are much more expensive.

In addition, these impart a very undesirable odor and flavor to bread. The raw, fresh potato also shows some bleaching effect, but not nearly as much as the legumes. Various types of seeds, tubers, bulbs, and nuts, especially peanuts, have shown some bleaching effect, but much less than soy-beans.

The present invention serves to eliminate certain difficulties and complex treatments inherent in other well known processes by the provision of a bleaching agent that is cheaply and readily prepared; that is easily obtained in the raw state; that in no way affects the flour except to decolorize the carotin therein, that possesses food value; that is efficient and satisfactory in use in that it may be and preferably is incorporated in the flour when the dough is mixed preparatory to baking the bread, thereby eliminating the time and expense of a separate bleaching operation.

This bleaching agent is entirely of vegetable origin and is apparently itself an enzyme-like or enzyme-containing substance. It decolorizes the yellow carotin which gives unbleached flour its characteristic yellowish color. In its preferred form it contains an abundance of active bleaching or carotin-removing enzymes. The bleaching property of the agent is destroyed at the temperature of boiling water. It acts rapidly at temperatures between 40 and 50 degrees centigrade, and fairly rapidly at room temperature.

The present process of bleaching flour, or more exactly the dough made therefrom, has a number of advantages, particularly over other well-known so-called "chemical" processes. In the first place, no harmful chemicals are used. Secondly, proper and uniform bleaching is assured without danger of overtreatment of the flour or dough. The present agent is easily distributed evenly throughout the dough. The use of an excess of several times the amount necessary to bleach the flour will cause no damage whatever, although large excessive amounts if certain beans be used, as for example, soy-beans, will provide an undesirable bean flour flavor. Also, the color of the soy-bean flour will begin to become noticeable, since the bleaching action operates selectively to whiten the unbleached wheat flour but does not whiten the bean flour. Thirdly, the baking characteristics of the flour are not changed. Thus, the baker can obtain any desired further development of his dough and gluten by use of a yeast food, high-speed mixing, etc. Fourthly, wheat flour can be manufactured and sold unbleached, in which condition it is best fitted to keep well in storage.

Bakery products of the highest class have been obtainable when lightly or partly bleached, or unbleached flour has been whitened in accordance with the present invention. Most important, however, is the avoiding of damage to flour, previously a common result in processes employing chemicals.

All the commercial vegetable flours investigated in the development of this invention have shown little or no bleaching strength. They evidently have been produced in such a way as to harm any bleaching principle which might have been contained in the raw material. No doubt they had been heated higher than the temperature specified herein, either to produce a more agreeable flavor or preparatory to the extraction of oil. This is especially true with the commercial soy-bean flours on the market, according to which, even though the beans have a rather high oil content (about 20%), it is necessary to heat the beans to facilitate expelling the oil, and usually to a temperature too high for the enzymes to remain active.

We claim:

1. A process of making bread comprising incorporating with unbleached or lightly bleached flour and other ingredients to form a dough batch, a carotin-decolorizing agent comprising an aqueous dispersion of raw comminuted vegetable material having active carotin bleaching enzymes.

2. A process of making bread comprising incorporating with unbleached or lightly bleached flour and other ingredients to form a dough batch, a vegetable decolorizing agent comprising an extract of raw vegetable material containing dough-bleaching enzymes.

3. A process of making bread comprising incorporating with unbleached or lightly bleached flour and other ingredients to form a dough batch, a vegetable decolorizing agent comprising a liquid containing active carotin decolorizing enzymes of the type found in soy-beans.

4. A process of making bread comprising incorporating with unbleached or lightly bleached flour and other ingredients to form a dough batch, a carotin-decolorizing agent comprising soy-bean milk and containing active carotin decolorizing enzymes.

5. A process of making bread comprising incorporating with unbleached or lightly bleached flour and other ingredients to form a dough batch, a vegetable decolorizing agent comprising an extract from leguminous material, said extract containing active carotin-decolorizing enzymes.

6. A process of making bread comprising incorporating with unbleached or partly bleached flour and other ingredients in the presence of oxygen-containing gas to form a dough batch, a raw vegetable decolorizing agent dispersed in water and containing active carotin decolorizing enzymes.

7. A process of making bread comprising incorporating with unbleached or partly bleached flour and other ingredients in the presence of oxygen-containing gas to form a dough batch, a vegetable decolorizing agent comprising a dispersion of vegetable enzymic material in water containing active enzymes capable of decolorizing carotin.

8. A process of making bread comprising incorporating with unbleached or partly bleached flour and other ingredients in the presence of air to form a dough batch, an aqueous dispersion of carotin-decolorizing material containing active enzymes and derived solely from vegetable origin.

9. A process of making bread comprising incorporating with unbleached or partly bleached flour and other ingredients in the presence of air under high speed agitation to form a dough batch, an aqueous dispersion of carotin-decolorizing matter derived solely from vegetable origin and containing active enzymes.

10. A process of making bread comprising incorporating with unbleached or lightly bleached flour and other ingredients to form a dough batch, an aqueous dispersion of carotin-decolorizing matter derived solely from vegetable origin and containing active enzymes.

11. As a new material in the manufacture of dough, an aqueous dispersion of raw vegetable carotin-decolorizing matter and containing active enzymes.

12. As a new material in the manufacture of dough, an aqueous dispersion of vegetable matter having active dough-bleaching and carotin decolorizing enzymes.

13. As a new material in the manufacture of dough, an aqueous extract of vegetable matter having active carotin decolorizing enzymes of the type found in soy-beans.

14. As a new material in the manufacture of dough, comminuted raw legumes dispersed in a liquid medium and containing active carotin decolorizing enzymes.

15. As a new material in the manufacture of dough, comminuted raw soy-beans dispersed in a liquid medium and containing active carotin decolorizing enzymes.

16. As a new material in the manufacture of dough, an aqueous extract of soy-beans containing active carotin-decolorizing material.

LOUIS W. HAAS.
RALPH M. BOHN.